March 2, 1943.  B. W. FREEMAN ET AL  2,312,330
ORNAMENTING MACHINE
Filed March 25, 1938  3 Sheets-Sheet 2

Inventors
Benjamin W. Freeman,
Frederick Stuart Knight,
By Riordon & Riordon
Attorney March 2, 1943.　　B. W. FREEMAN ET AL　　2,312,330
ORNAMENTING MACHINE
Filed March 25, 1938　　3 Sheets-Sheet 3
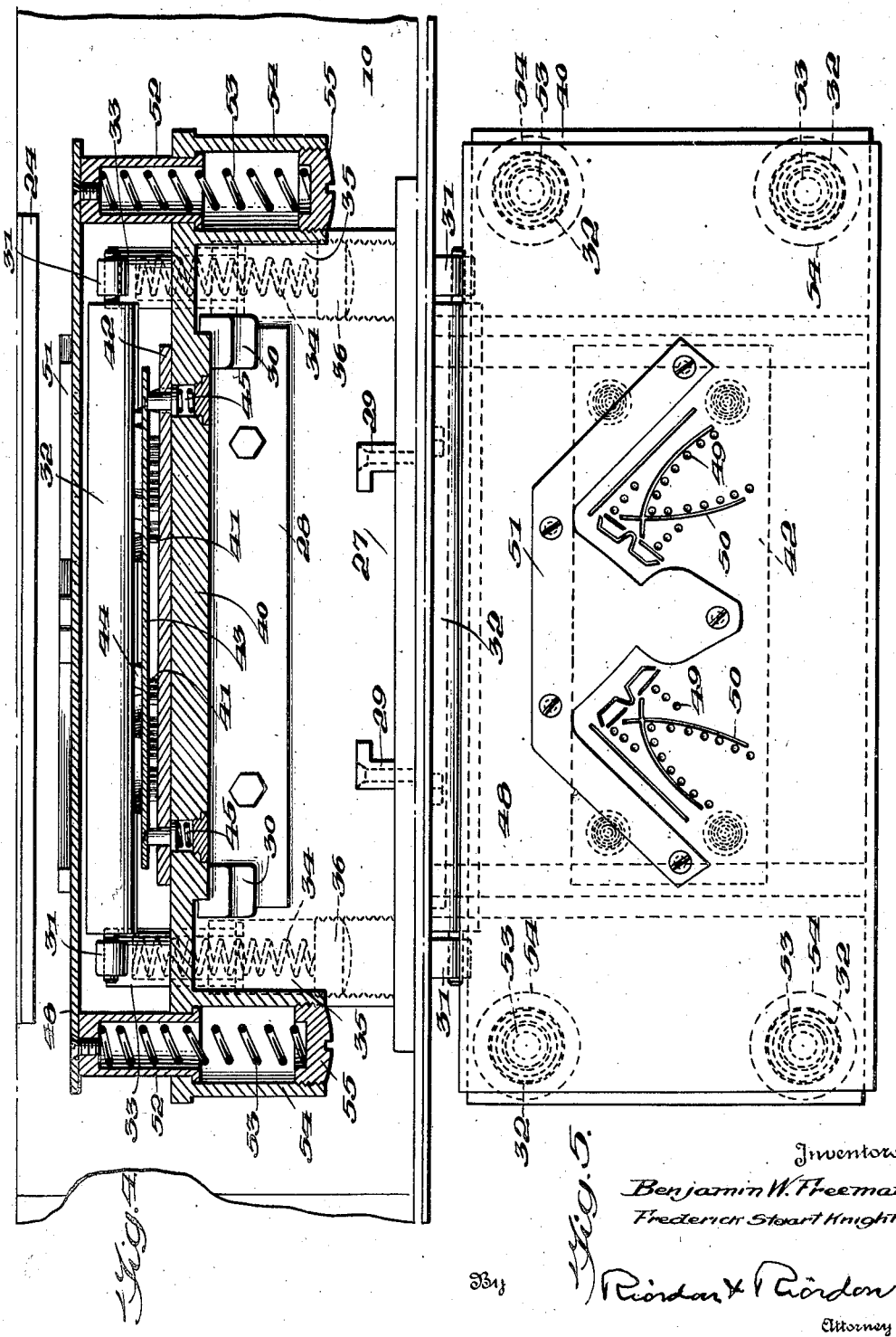

Patented Mar. 2, 1943

2,312,330

UNITED STATES PATENT OFFICE 2,312,330

ORNAMENTING MACHINE

Benjamin W. Freeman, Cincinnati, Ohio, and Frederick Stuart Knight, Brockton, Mass.; said Knight assignor to said Freeman Application March 25, 1938, Serial No. 198,120

20 Claims. (Cl. 101—324)

This invention relates to machines and dies for use in the manufacture of boots and shoes, and more particularly to combined marking and cutting machines, and dies therefor, adapted for operations upon skins, flat upper blanks, fitted or closed uppers, and the like, in which the work is marked with ink, pigment or its equivalent at the same time, or as part of a cycle of operations during which the work is also ornamented by perforating or cutting out a design therein. It is a feature of the invention that the marking and perforating or cutting may be performed as a single complete operation during which the work is not removed from the machine, nor from a gauged position in alignment with the cutting and marking portions of the die.

Such machines, broadly, are known, and as illustrative of types of machine in which such work is accomplished, reference may be made to the patents to Benj. W. Freeman, Re. 21,321, January 16, 1940, and Re. 20,177, Nov. 17, 1936, and to the patent of Benj. W. Freeman et al., Re. 20,294, dated March 16, 1937.

In the first of these patents, the work is placed on a support and a gauge plate forming part of the die structure brought down upon the work. The work is then accurately positioned by reference to a gauging edge or its equivalent on the gauge plate, which plate also functions as a clamp or hold-down for the work. An ink applying roll or pad is then interposed into the space between the marking elements of the die and the work gauging plate, to apply ink to the marking elements; the ink applying member and die unit are then separated, and the marking and cutting portions of the die moved relatively to the work, for operation through openings in the plate, to mark and perforate the work. As the ornamenting portions of the die, and the work are separated, the work engaging plate functions to strip the work from the cutters, being somewhat assisted in this operation by the marking elements which are mounted yieldably with respect to the cutting edges of the die.

In Reissue Patent 20,177 the work is placed on a slidable table or carriage by reference to gauges thereon, and is moved laterally with the carriage to a position beneath a reciprocating plunger, which carries an ornamenting die. A suitable reaction member may be located in alignment with the plunger such that when the work has been moved laterally, a relative movement between the die and the work will effect an ornamentation after which the work may be replaced by a fresh work piece. In this instance the ink applying member is mounted upon the sliding die carriage, to apply ink during normal lateral movements of the carriage, and the work is stripped or removed from the cutters of the die by a stripping plate which in said embodiment carries marking elements which provide inking surfaces for ink marking or printing the work during the cycle of operations in which the cutters perforate the work.

In Reissue 20,294, the work is mounted on a reciprocating plunger. The die partakes of a lateral movement with respect to the work until the work and die are aligned, whereupon relative vertical movement between the work support and die will effect an ornamentation. In this type of machine, however, the marking plate while mounted resiliently, is provided with springs which are in themselves insufficient to effect a complete stripping of the work, being in this respect similar to the disclosures of Re. 21,321. Such springs as are used for the marker in both instances are of sufficient strength to normally position the marking edges in advance of the cutters so that the marking edges may be properly inked without getting ink on the cutters and the strength of the springs across is so proportioned as to effect a relatively light printing pressure as contrasted with pressures required to hold the work on its support, while the cutters and work are being relatively separated. The main stripping pressures in the disclosure of Reissue No. 20,294 are applied through a separate mechanism mounted in the head of the machine member. This mechanism is comparable in some respects to the use of a work-engaging clamping plate described in Patent Re. 21,321. The stripping mechanism of Reissue Patent No. 20,294 is located in the head of the machine and not in the die, thus making it possible to apply very heavy pressures, and hence is generally utilized in a machine of heavier nature, somewhat more complicated than the first two types disclosed above. In all types of machine, however, the marking elements of the die are automatically inked, and the machines are provided with safety mechanism including control means for a main clutch which is designed to connect operating parts of the machine to a suitable source of power, the idea being to prevent injury to the work or to the operator by inadvertent operation of the machine.

It is contemplated that the present invention will accomplish the main objects and major features of these several and other types of combined cutting and marking machines known to the art.

Among the objects of this invention is the separation of stripping mechanism including plates, springs, etc., from the operating elements (i. e., the cutting and marking elements) of the die unit, while at the same time incorporating necessary stripping means in the die unit as distinguished from building same into the machine. Such an organization broadly is taught in Patent No. Re. 21,321, which shows an arrangement in which the work engaging plate is movable with respect to the ornamenting elements of the die, and functions as a stripper, the illustrated embodiment of the patent being a reversal of the die unit illustrated herein.

Another object is directed to a work positioning arrangement, also broadly taught in Re. 21,321, wherein a single means combines the functions of gauging the work for accurate positioning in the machine, and stripping the work from the die, which means is so related to the marking elements as to provide space for inking the die between the gauge means and the markers.

It is also contemplated, under the principles taught in said patent, that the work will be protected by the gauging means, from accidental application of ink when the die is inked.

Again, it is desirable to prevent accidental application of the marking medium to cutting elements of the die, and an object of this invention contemplates a mounting of the marking elements slightly advanced with respect to the cutters, such that ink will be applied normally, exclusively to the marking elements, but yieldingly, such that the cutters may function to operate on the work. Thus, when the ink applying member is between work gauging, stripper plate and the operating elements of the die, both the work and cutters are protected, yet the marker may be inked with ease.

A still further object includes means to strip the work by a stripper plate which, in addition to the above functions, will be actuated in stripping by pressure developed by pressure means independent of and separate from the operating elements of the die unit.

While the means for applying stripping pressures is independent of the operating elements of the die, it is contemplated that the combined stripper and gauge plate, together with the springs or other means for exerting stripping pressures thereon, will all be built into the same unit which includes the marking and cutting or perforating elements of the die.

While various relative movements may be arranged to bring the work and die into an ornamenting relation to the plunger or power means of the machine, in a preferred embodiment illustrated herein the die unit in its entirety, with the work accurately positioned thereon, will be moved from a work gauging position where the operator positions the work on the work support to a work presenting position beneath the plunger of the machine. It will be noted from the following description that in such preferred embodiment, the work support moves with the die to this work presenting position, but in this connection, it will be observed that in Reissue Patent No. 20,177, the work is moved with its support independently of the die, and the die may be mounted either in fixed relation to the bed of the machine, or in fixed relation laterally, upon the plunger of the machine.

The machine of this invention will, in general, have a reciprocating plunger with a paper feed, the paper feeding from back to front. The machine will be made with removable tables to accommodate both flat bed and anvil dies, as well as cutting and ink marking dies. A preferred form of cutting and ink marking die in accordance with the invention will be made with its stripper or gauge plate, upon which the work may be supported, normally positioned in spaced relation to the cutting edges of the die a distance providing sufficient room for interposition of the ink roll or equivalent ink applying member between the plate and the cutting edges as the die is moved from work placement to work cutting position.

In the illustrated embodiment there is an inking member which is resiliently mounted upon arms extending towards the rear of the machine, such that in the uppermost position of the roll, the lower part thereof will contact the marking elements of the die. The ink applying mechanism is so arranged and mounted that the inking member will move up and down, due to its resilient mounting, with the raising and lowering of the plunger, and the support for the ink roll will extend between the main part of the die and the stripper, with the stripper or work support mounted on the die at the outside of the ink roll support. Obviously, with this arrangement, the work is supported at one side of the work gauging plate, and the ink applying means for the die is on the other side, whereby only the marker elements are inked, and the plate intervening prevents the inking mechanism from touching the work, thus following the principles of Patent Re. 21,321.

An advantage of this type of construction resides in the fact that the gauge plate, which is also a stripper, is mounted on the die, always in predetermined relation to the cutting and marking elements. The plunger of the machine will, of course, have a throw sufficient to depress the stripper during an ornamenting operation, and to provide the necessary clearance between the stripper and the plunger. Naturally, the smaller the ink roll or the thinner the pad, if a pad is used, the smaller the throw.

The controls and mechanism for insuring accurate placement of the die beneath the plunger may be substantially the same as in the aforesaid patents, to which reference may be made for a more detailed showing thereof.

For a more complete description of the invention and to the attainment of the foregoing and other objects which will appear as the description proceeds, reference may be made to the accompanying drawings, in which:

Fig. 2 is a front elevation thereof.

Fig. 3 is an enlarged side elevation, partly in section, of the die parts of Fig. 1.

Fig. 4 is an enlarged front elevation partly in section, illustrating details of die construction, and Fig. 5 is an en enlarged plan of die parts.

Figure 1:
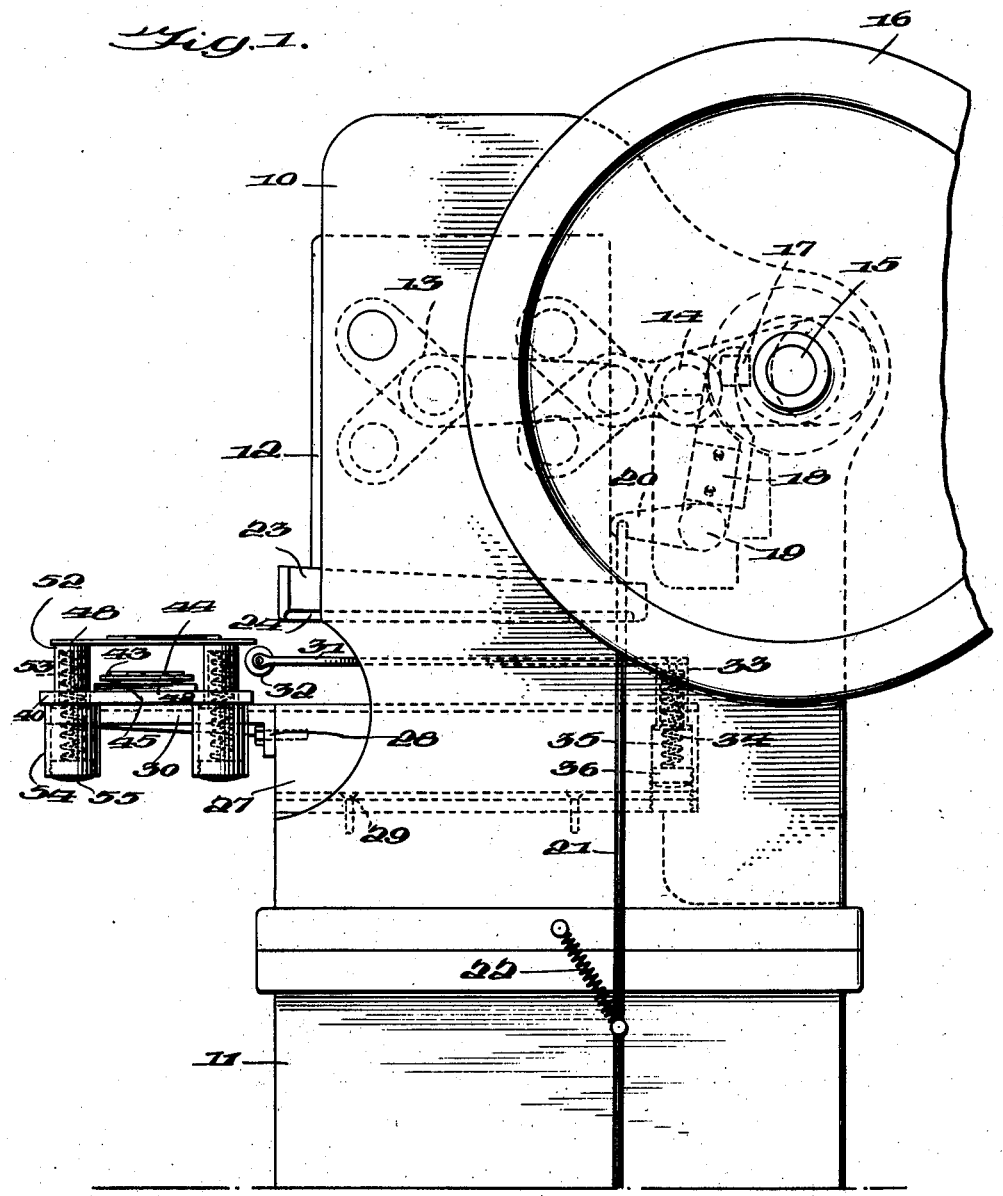
Figure 1 is a side elevation of the machine with the die in work placing position.

Referring now more particularly to the drawings, in which like reference numerals designate like parts, there will be found a main frame or housing 10 which may be mounted upon a suitable stand or base 11. A plunger 12 reciprocates in the frame 10, being driven by a toggle mechanism 13 driven from a suitable crank 14 which in turn is actuated by a main shaft 15 through the medium of a fly wheel or driving pulley 16, through a single revolution clutch mechanism 17. The clutch will be controlled by a clutch wedge or lever 18. The details of the driving mechanism and clutch mechanism are conventional and examples thereof will be found in the patents above mentioned. For purposes of illustration, it may be noted that the clutch mechanism is operatively interposed between the constantly rotating fly wheel pulley 16 and the intermittently rotating shaft 15, and is designed to connect the pulley to the shaft 15 under the influence of the clutch lever 18 which is pivoted at 19 to the machine. The clutch lever is in the general form of a bell crank having its lower arm 20 connected to a treadle link 21 which extends to any point convenient to an operator for connection to a treadle.

A treadle spring 22 serves to return the parts to normal position, and it is to be understood that the clutch, being of the single revolution type will permit but a single operation of the machine, even though the operator might keep her foot on the treadle after an initial depression.

The operating portion of the plunger 12 is made in the form of a tapered plate or slide 23, provided with an operating surface 24 of brass, or other material softer than the cutting edges of the die, and this plate is provided with adjusting means, (not shown) by means of which it may be moved relative to the plunger proper. Such adjustment by virtue of the tapered upper surface of the slide 23 will have the effect of increasing or decreasing the overall length of the plunger 12, and thereby varying the effective length of the stroke of the plunger. Such variation will in turn vary the pressure applied to the work beneath the surface 24. A suitable backing paper or equivalent medium will be fed between the surface 24 and work on the work support, with the paper feeding from back to front, the purpose being to insure a good clean cut and the presentation of a fresh cutting surface to the die for each stroke of the plunger.

Mounted in the bed of the machine, beneath the plunger 12 is a removable table or auxiliary bed 27, this auxiliary bed being secured in place by and slidably removable upon suitable guides 29. When this auxiliary bed is in place, dies of the flat bed type may be used, but if it is desired to use a die of the anvil type, which dies have a greater height than the flat bed style, then the auxiliary bed may be removed.

Secured to the auxiliary bed is a bracket 28 from which a pair of guide arms 30—30 project, these arms forming a track for the die unit, whereby the die unit may be positioned at the front of the machine for placement of work thereon, and thereafter slid into the machine upon the bed, to a location beneath the plunger. A suitable stop mechanism, of conventional nature, may be provided, if desired, to limit the inward movement of the die and to lock the treadle and control mechanism for the plunger until the die reaches a proper position.

Also mounted within the frame of the machine is a pair of arms 31—31, which supports between their outer ends, an ink roll 32. The inner ends of these arms are mounted resiliently upon plungers or cylinders 33—33, each of which houses a spring 34. The plungers 33 are each slidable in a well 35 at the rear of the auxiliary bed, the lower ends of the springs abutting an adjusting screw 36, whereby the compression of the springs may be regulated. The spring mounting permits depression of the arms 31 and ink roll 32 with the plunger, the arms 31 being positioned to clear the die unit as the unit is moved inwardly and outwardly.

The die unit consists of a base 40 carrying tubes or cutters 41 arranged in any desired pattern, these tubes usually being carried on a tube 42 which is secured to the die base. Mounted above the tubes and overlying same is a marker plate 43 carrying marking ribs or projections 44, this marker plate 43 being resiliently mounted for relative movement with respect to the tubes, i. e., after engagement between the work and the ribs 44, the marker plate will yield to permit passage therethrough of the tubes, the plate of course being suitably perforated.

The springs 45 which support the marker plate do not require sufficient strength to strip the work from the tubes after a perforating operation, it being merely necessary to provide sufficient pressure for printing or marking purposes, and for maintaining the projections of the marker plate in a plane slightly advanced with respect to the plane of the cutting edges, this pressure usually being such as not to indent the work. It is true that whatever pressure the springs may develop will be added to the stripping pressures hereinafter described, and may in some slight measure facilitate stripping but, as stated, this is not the primary purpose. By projecting the marking edges 44 beyond the cutting edges of tube 41, it is possible to apply ink to the marker plate without getting such ink on the tubes, or on any parts of the die unit which would tend to cause a smearing of the work.

A combined stripper and work gauging plate 48 is mounted in spaced relation to the marking elements of the die, preferably a distance slightly greater than the diameter of the ink roll 32.

This plate will be suitably cleared, as indicated at 49 to permit passage of the cutting elements or tubes past the plate, to the work, and similarly cleared as at 50 for the marking ribs or projections. The plate also carries a gauging medium, illustrated herein as an edge gauge 51, by means of which the work may be accurately positioned and aligned with the die beneath the plate 48. The thickness of this edge gauge need be substantially no greater than the thickness of the work, or if desired spring mounted pins or any other equivalent gauging medium may be utilized.

The plate 48 is carried by hollow posts 52 housing springs 53, and slidable in wells 54 carried by the die base. The springs 53 abut adjusting screws 55 whereby the compression of the springs 53 may be regulated. These springs 53 are of course heavier than the springs 45, since they are used primarily for stripping, whereas the springs 45 are primarily for marking or printing.

From the foregoing, the operation of the machine may be readily ascertained. With the die unit in its outermost position as illustrated in Fig. 1, work is placed upon the plate 48 and accurately aligned with the cutting and marking portions of the die, by means of the gauge plate 51. The die unit is then pushed inwardly, and during its inward movement the ink roll 32 will be interposed beneath the work supporting plate, i. e., at the opposite side thereof from the work, and will contact the marking ribs 44. Since the work is separated from the ink roll by the plate 48, and the marking ribs are projected above the cutting edges of the die, it will be evident that no ink will contact either the work or cutters. Continued inward movement of the die will clear the ink roll, and the machine may then be treadled. If a safety mechanism as mentioned above is provided, the machine of course cannot be treadled until the die reaches its innermost position. As a further safety item, it will be apparent that before the die unit reaches a position where it releases the controls to permit the machine to be treadled, the roll will have passed completely through the die unit, and should the operator's fingers be inadvertently interposed between the underside of the plate 48 and the base 40, the roll will sweep her fingers out of the way; by the same token it follows that regardless of whether or not there is any marking medium on the roll, the passage of the roll across the marking elements will have the effect of sweeping or clearing off any chips or cuttings which may have become deposited on the marker.

Upon treadling of the machine, the plunger will descend, return and come to rest, through the action of the single revolution clutch 17. With the downward movement of the plunger, the arms 31—31 which support the ink roll will yield, because of their resilient mounting.

The plunger will first engage the work against the plate 48, and then the plate, work and plunger will descend together until the marking ribs engage the work. Continued movement will depress the marker until the tubes 41 engage and perforate the work through the openings 49. Upon recession of the plunger, the marker and plate 48 will rise as a unit, to the limit of movement of the marker, during which time the work will have been stripped, whereupon the plate 48 will continue to rise with the plunger into a spaced relation to the marker. It will be noted that the stripper springs 53 are much larger and more powerful than the marker springs 45, but that the marker renders some slight assistance to the stripping action during its movement with the plate 48. The springs 53 may be made as heavy as desired for stripping purposes, without in any manner affecting the ornamenting operations.

Having thus fully described our invention, what we claim as new and desire to secure by Letters Patent of the United States is:

1. An ornamenting machine comprising a bed, a pressure applying plunger, a die unit mounted for movement into operating position with respect to said plunger, a work support movable with said die unit, means on said support for aligning a work piece relative to said die, and resiliently mounted means to apply a marking medium to said die, located for interposition between said die unit and said work support during movement of said die unit.

2. An ornamenting machine comprising a bed, a pressure applying plunger and a marking medium applicator having a resiliently mounted support, extending between said bed and said plunger, an ornamenting die unit having a cutter and a marker, said unit being mounted for movement laterally between said bed and said plunger, a gauge plate yieldably mounted on said die unit and spaced from the marker of said unit a distance sufficient to permit interposition of the applicator between the gauge plate and the marker at the opposite side of said plate from the work, during movement of the die unit, whereby the marking medium may be applied exclusively to said marker.

3. An ornamenting machine comprising a bed, a pressure applying plunger and a marking medium applicator having a resiliently mounted support, extending between said bed and said plunger, an ornamenting die unit having a cutter and a marker, said unit being mounted for movement laterally between said bed and said plunger, a gauge plate having a face adapted to contact the work, yieldably mounted on said die unit and spaced from the marker of said unit a distance sufficient to permit interposition of the applicator between the gauge plate and the marker at the opposite side of said plate from its work contacting face, during movement of the die unit, whereby the marking medium may be applied solely to said marker, and means to actuate said plunger toward a work piece contacting said plate thereby to hold the work against said plate and to thereafter engage the work piece with the die unit on the opposite side of the plate.

4. An ornamenting machine comprising a bed, a pressure applying plunger and a marking medium applicator having a resiliently mounted support, extending between said bed and said plunger, an ornamenting die unit having a cutter and a marker, said unit being mounted for movement laterally between said bed and said plunger, a gauge plate having a face adapted to contact the work, yieldably mounted on said die unit and spaced from the marker of said unit a distance sufficient to permit interposition of the applicator between the gauge plate and the marker, at the opposite side of said plate from its work contacting face, during movement of the die unit, whereby the marking medium may be applied solely to said marker, means to actuate said plunger toward a work piece contacting said plate thereby to hold the work against said plate and to thereafter engage the work piece with the die unit on the opposite side of the plate, and means to separate said plate and cutter after an ornamenting operation to strip the work from the cutter.

5. An ornamenting machine comprising a bed, a die mounted for lateral movement thereon, a work gauging and holding plate associated with said die, and mounted for relative movement with respect to said die in one direction during operations on the work and in the opposite direction to strip the work from the die, after such operations, means including a plunger to apply the work, said plate, and said die together under pressure, said plate being so constructed and arranged that the ornamenting operation may be effected through the plane thereof, and yieldably mounted means in said machine positioned to apply a marking medium to the die at the opposite face of said plate from the work, during movement of the die from an inoperative to an operative position.

6. An ornamenting machine comprising a bed, a die mounted for lateral movement thereon, a work gauging and holding plate associated with said die, and mounted for relative movement with respect to said die in one direction during operations on the work and in the opposite direction to strip the work from the die, after such operations, means including a plunger to apply the work, said plate, and said die together under pressure, said plate being so constructed and arranged that the ornamenting operation may be effected through the plane thereof, and yieldably mounted means in said machine positioned for interposition between said plate and said die, for applying a marking medium to the die at the opposite face of said plate from the work, during movement of the die from an inoperative to an operative position.

7. An ornamenting machine comprising a bed, a die, a work supporting gauge plate in advance of said die mounted for movement in one direction relative to said die during ornamentation of a work piece carried by the plate and for movement in the opposite direction relative to said die to strip the work from the die, means to move said plate including a plunger effective to apply said work piece and said plate under pressure to the die, said plate being movable laterally to present the work to the plunger, said plate being so constructed and arranged that the ornamenting operation may be effected through the plane of said plate, and resiliently mounted means extending between said bed and plunger for applying a marking medium to the die at the opposite face of said plate from the work during presentation of the work and plate to the plunger.

8. An ornamenting machine comprising a bed, a die, a work gauging and holding plate associated with said die and mounted for relative movement with respect to said die in one direction during operations on the work and in the opposite direction to strip the work from the die, after such operations, means including a plunger to apply the work, said plate and said die together under pressure, said die and plate being movable laterally as a unit to present the work to the plunger, said plate being so constructed and arranged that the ornamenting operation may be effected through the plane of said plate, and resilient means in said machine extendible between said plate and said die to apply a marking medium to the die at the opposite face of said plate from the work during presentation of the work to the plunger.

9. An ornamenting machine comprising a bed, a die, a work gauging and holding plate associated with said die and mounted for relative movement with respect to said die in one direction during operations on the work and in the opposite direction to strip the work from the die, after such operations, means including a plunger to apply the work, said plate and said die together under pressure, said die and plate being movable laterally as a unit to present the work to the plunger, said plate being so constructed and arranged that the ornamenting operation may be effected through the plane of said plate, resilient means in said machine extendible between said plate and said die to apply a marking medium to the die at the opposite face of said plate from the work during presentation of the work to the plunger, said medium applying means comprising a support, spring mounted at the rear of the machine to project between said plunger and bed, and an inking member carried by the support at the front of the machine beyond the path of movement of the plunger.

10. An ornamenting machine comprising a bed, a die having a cutter and a marker, a work engaging plate in advance of said die mounted for relative movement with respect to said die in one direction during operations on the work and in the opposite direction to strip the work from the die, after such operations, means including a plunger to apply the work, said plate, and said die together under pressure, said plate being so constructed and arranged that the ornamenting operation may be effected through the plane of said plate, and resiliently mounted means for applying a marking medium to the marker of the die, during presentation of the work to an operating position, at the opposite face of said plate from the work, said marker being resiliently projected beyond the plane of the cutter for reception of a marking medium to the exclusion of the cutter.

11. In an ornamenting machine, the combination with a work supporting and stripping means, and an ornamenting means including a marking plate having at least one marking die thereon, of spring means acting on the marking plate, and means acting on the work supporting and stripping means independently of said spring means, for exerting a stripping pressure on the work, and ink applying means in said machine positioned for interposition between said marking plate and said stripping means, upon a relative movement between the die and the ink applying means, for applying ink to the marking die.

12. In an ornamenting machine, the combination with a work supporting and stripping plate, and an ornamenting means including a base, cutting edges extending from said base, and a marking plate having at least one marking die thereon, of spring means acting on the marking plate normally to project the marking die thereof beyond the plane of said cutting edges, and means acting on the work supporting and stripping means independently of said spring means, wherein said last means and said spring means both act in a direction to cause each of them to exert a stripping pressure on the work, and ink applying means in said machine positioned for interposition between said marking plate and said stripping means, upon a relative movement between the die and the ink applying means, for applying ink to the marking die.

13. In an ornamenting machine, a combined ink marking and cutting die unit, means to mount said unit for movement into and out of an operative position comprising a base, cutting edges extending from said base, marking means on said base mounted in advance of said cutting edges, whereby a marking medium may be applied exclusively to said marking means, a combined work holding, gauging and stripping plate mounted in said unit in advance of said marking means, normally spaced therefrom sufficiently to permit interposition of a marking medium applicator between said plate and said marking means, means to operatively interpose an applicator during normal, uninterrupted movement of the die unit from an inoperative to an operative ornamenting position and means mounting said plate for substantially vertical movement relative to said marking means.

14. In an ornamenting machine, a combined ink marking and cutting die unit comprising a base, cutting edges extending from said base, marking means on said base mounted in advance of said cutting edges, whereby a marking medium may be applied exclusively to said marking means, yieldably mounted marking medium applying means in said machine, for said unit a combined work holding, gauging and stripping plate mounted in said unit in advance of said marking means, and normally spaced therefrom sufficiently to permit interposition of said marking medium applicator between said plate and said marking means, during presentation of the work to an operating position.

15. In an ornamenting machine having a pressure resisting bed, and a pressure applying plunger, the combination with a die unit comprising a movably mounted work supporting and gauging plate, a resiliently mounted marking die, and a cutting die, yieldably mounted means to apply ink to said marking die, means to move and hold said supporting and gauging plate spaced from said marking die for interposition of said ink applying means between the plate and die, said ink applying means and said die being mounted for relative movement, to apply ink to the die, and means to actuate said plunger to produce a relative movement between said plate and die to ornament the work.

16. In an ornamenting machine having a pressure resisting bed, and a pressure applying plunger, the combination with a die unit comprising a movably mounted work supporting and gauging plate, a resiliently mounted marking die, and a cutting die, yieldably mounted means to apply ink to said marking die, means to move and hold said supporting and gauging plate spaced from said marking die for interposition of said ink applying means between the plate and die, said ink applying means and said die being mounted for relative movement, to apply ink to the die, and means to actuate said plunger to produce a relative movement between said plate and die, and at the same time to produce a relative movement between the work and the die, to ornament the work.

17. An ornamenting machine comprising a bed, a pressure applying plunger, a die unit mounted for movement into operating position with respect to said plunger, a work support movable with said die unit in one direction, and relative to said die unit in another direction, means on said support for alining a work-piece relative to said die, and resiliently mounted means to apply a marking medium to said die, the resilient mounting for said means extending between said plunger and bed, and the medium applying means being located for interposition between said die unit and said work support during movement of said die unit.

18. A combined ink marking and perforating machine having, in combination, a stripper plate, a marking die having its marking edge spaced from the stripper plate, a normally stationary, but yieldable ink applying means, and means for moving the stripper plate and the marking edge to insert the ink applying means between the marking edge and the stripper plate, said ink applying means being normally positioned in the plane of the marking edge, whereby to apply the ink upon said movement, said ink applying means being yieldably mounted for movement out of its normal plane.

19. In an ornamenting machine, an ornamenting die structure movable from work placing to work ornamenting position, comprising a base, ornamenting elements mounted on said base, a combined work support and stripper resiliently mounted on said base in spaced relation to said ornamenting elements sufficient to permit ready access to said elements, means mounting part of said ornamenting elements for resilient movement relative to the remaining ornamenting elements, and to said combined work support and stripper, and means in said machine positioned for insertion between said combined work support and stripper and said resiliently mounted ornamenting elements, effective to engage and pass across said resiliently mounted elements upon movement of the die into and out of operative position.

20. In an ornamenting machine, an ornamenting die structure movable from work placing to work ornamenting position, comprising a base, ornamenting elements mounted on said base, a combined work support and stripper resiliently mounted on said base in spaced relation to said ornamenting elements sufficient to permit ready access to said elements, means mounting part of said ornamenting elements for resilient movement relative to the remaining ornamenting elements, and to said combined work support and stripper, means in said machine positioned for insertion between said combined work support and stripper and said resiliently mounted ornamenting elements, effective to engage and pass across said resiliently mounted elements upon movement of the die into and out of operative position, and means yieldably mounting said insertable means in the machine.

BENJAMIN W. FREEMAN.
FREDERICK STUART KNIGHT.